United States Patent
Kangas

(10) Patent No.: US 12,208,548 B2
(45) Date of Patent: Jan. 28, 2025

(54) COMPOSITE FOAM ARTICLE

(71) Applicant: Proprietect L.P., Toronto (CA)

(72) Inventor: Kevin G. Kangas, Troy, MI (US)

(73) Assignee: Proprietect L.P., Toronto (CA)

( * ) Notice: Subject to any disclaimer, the term of this patent is extended or adjusted under 35 U.S.C. 154(b) by 443 days.

(21) Appl. No.: 17/432,139

(22) PCT Filed: Feb. 19, 2020

(86) PCT No.: PCT/IB2020/051389
§ 371 (c)(1),
(2) Date: Aug. 19, 2021

(87) PCT Pub. No.: WO2020/170163
PCT Pub. Date: Aug. 27, 2020

(65) Prior Publication Data
US 2022/0184863 A1    Jun. 16, 2022

Related U.S. Application Data

(60) Provisional application No. 62/807,292, filed on Feb. 19, 2019.

(51) Int. Cl.
*B29C 44/16* (2006.01)
*B29C 44/34* (2006.01)
(Continued)

(52) U.S. Cl.
CPC ............ *B29C 44/16* (2013.01); *B29C 44/351* (2013.01); *B29C 44/42* (2013.01); *B29C 44/588* (2013.01);
(Continued)

(58) Field of Classification Search
CPC ....... B29C 44/588; B29C 44/16; B29C 44/02; B29C 44/351; B29K 2075/00; B29L 2031/58
See application file for complete search history.

(56) References Cited

U.S. PATENT DOCUMENTS 3,891,363 A    6/1975 Sievers et al.
4,431,047 A    2/1984 Takeshima et al.
(Continued)

FOREIGN PATENT DOCUMENTS

DE    3622598 A1    4/1988
DE    19938140 A1    3/2001
(Continued)

OTHER PUBLICATIONS

International Search Report for Application No. PCT/IB2020/051389 dated Apr. 30, 2020, 2 pages.
(Continued)

*Primary Examiner* — Seyed Masoud Malekzadeh
*Assistant Examiner* — Debjani Roy
(74) *Attorney, Agent, or Firm* — Howard & Howard Attorneys PLLC

(57) ABSTRACT

An assembly for molding a composite article including a foam core and a layer is disclosed. The assembly includes a mold. The mold has an inner surface and at least partially defines a cavity, one or more gas discharge ports, and one or more retaining elements. Each of the one or more gas discharge ports has a passageway opening in fluid communication with the cavity of the mold the mold. The assembly further includes one or more sealing elements moveably engaged with the mold. Each of the one or more sealing elements includes a head and is shaped to engage the retaining element on the mold in a vented position. Further, each of the one or more sealing elements corresponds with each of the one or more gas discharge ports.

18 Claims, 9 Drawing Sheets

(51) Int. Cl.
  *B29C 44/42* (2006.01)
  *B29C 44/58* (2006.01)
  B29K 75/00 (2006.01)
  B29L 31/58 (2006.01)

(52) U.S. Cl.
  CPC ....... *B29K 2075/00* (2013.01); *B29L 2031/58* (2013.01)

(56) References Cited

U.S. PATENT DOCUMENTS

| | | | |
|---|---|---|---|
| 4,997,026 A | 3/1991 | Ozeki et al. | |
| 5,466,404 A | 11/1995 | Kiefer | |
| 5,587,183 A | 12/1996 | Clark et al. | |
| 5,762,842 A | 6/1998 | Burchi et al. | |
| 5,997,783 A * | 12/1999 | Hunter | B29C 44/588 264/276 |
| 6,206,336 B1 | 3/2001 | Espie et al. | |
| 6,352,659 B1 | 3/2002 | Clark et al. | |
| 7,331,561 B2 | 2/2008 | Keesler | |
| 7,481,637 B2 | 1/2009 | Cathcart et al. | |
| 8,366,429 B2 | 2/2013 | Cathcart et al. | |
| 8,850,664 B2 | 10/2014 | Nakamura | |
| 8,851,874 B2 * | 10/2014 | Rawlings | B29C 33/0038 425/116 |
| 8,899,302 B2 | 12/2014 | Bhola | |
| 9,180,607 B2 | 11/2015 | Suenaga et al. | |
| 9,427,901 B2 | 8/2016 | Itabashi et al. | |
| 9,808,968 B2 | 11/2017 | Yonezawa et al. | |
| 10,046,488 B2 | 8/2018 | Itabashi et al. | |
| 2010/0230019 A1 | 9/2010 | Sugata | |
| 2014/0312521 A1 | 10/2014 | Yonezawa et al. | |
| 2017/0261106 A1 * | 9/2017 | Hocker | F16L 11/121 |
| 2023/0191669 A1 * | 6/2023 | Bak | B29C 44/12 264/259 |

FOREIGN PATENT DOCUMENTS

| | | | |
|---|---|---|---|
| DE | 102012211911 A1 | 1/2014 | |
| DE | 102013224757 A1 | 6/2015 | |
| FR | 2688166 A1 | 9/1993 | |
| JP | S47007438 Y1 | 3/1972 | |
| JP | S57138626 U | 8/1982 | |
| JP | 2006069080 A | 3/2006 | |
| JP | 2009051127 A | 3/2009 | |
| JP | 2011161771 A | 8/2011 | |
| JP | 2011161772 A | 8/2011 | |
| JP | 2013063630 A | 4/2013 | |
| JP | 2017094584 A | 6/2017 | |
| TW | 200609095 A | 3/2006 | |
| WO | 2007099445 A2 | 9/2007 | |
| WO | 2009145089 A1 | 12/2009 | |

OTHER PUBLICATIONS

English language abstract for WO 2009/145089 A1 extracted from espacenet.com database on Aug. 30, 2021, 2 pages.
English language abstract for DE 199 38 140 A1 extracted from espacenet.com database on Aug. 30, 2021, 1 page.
English language abstract for JP 2011-161772 extracted from espacenet.com database on Aug. 30, 2021, 1 page.
English language abstract for JP 2011-161771 A extracted from espacenet.com database on Aug. 30, 2021, 1 page.
Partial computer-generated English language translation for JPS 47-007438 Y extracted from espacenet.com database on Jan. 3, 2024, 3 pages.
Computer-generated English language translation for JPS 57-138626 U extracted from espacenet.com database on Jan. 3, 2024, 5 pages.
English language abstract for JP 2006-069080 A extracted from espacenet.com database on Jan. 3, 2024, 1 page.
English language abstract for JP 2013-063630 A extracted from espacenet.com database on Jan. 3, 2024, 2 pages.
English language abstract for JP 2017-094585 A extracted from espacenet.com database on Jan. 3, 2024, 1 page.
Computer-generated English language abstract for DE 10 2013 224 757 A1 extracted from espacenet.com database on Apr. 24, 2023, 3 pages.
English language abstract for TW 200609095 A extracted from espacenet.com database on Apr. 24, 2023, 1 page.
Chinese Search Report for Application CN 2020800294263 dated Mar. 31, 2023, 2 pages.
English language abstract and machine-assisted English translation for DE 36 22 598 A1 extracted from espacenet.com database on Oct. 12, 2022, 5 pages.
English language abstract and machine-assisted English translation for DE 10 2012 211 911 A1 extracted from espacenet.com database on Oct. 12, 2022, 9 pages.
English language abstract and machine-assisted English translation for FR 2 688 166 A1 extracted from espacenet.com database on Oct. 12, 2022, 6 pages.
English language abstract and machine-assisted English translation for JP 2009-051127 A extracted from espacenet.com database on Oct. 12, 2022, 8 pages.
English language translation for and original Chinese language document of Liu, Xiwen, "Practical Tutorial on Plastic Injection Molding Technology", Printing Industry Prress, Oct. 2013, p. 165.

* cited by examiner

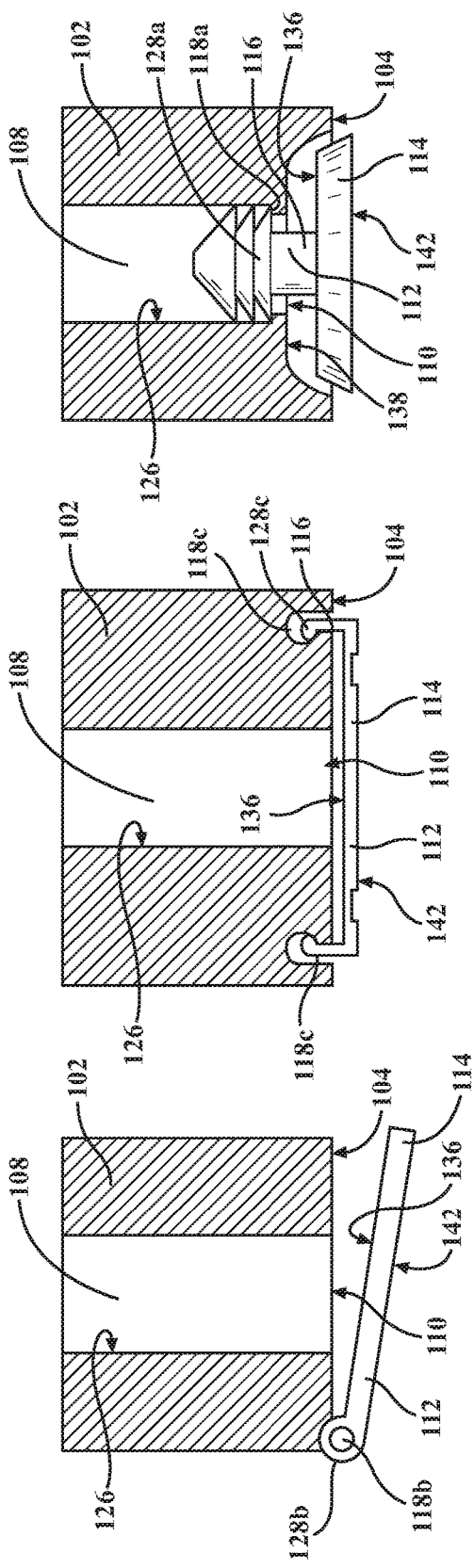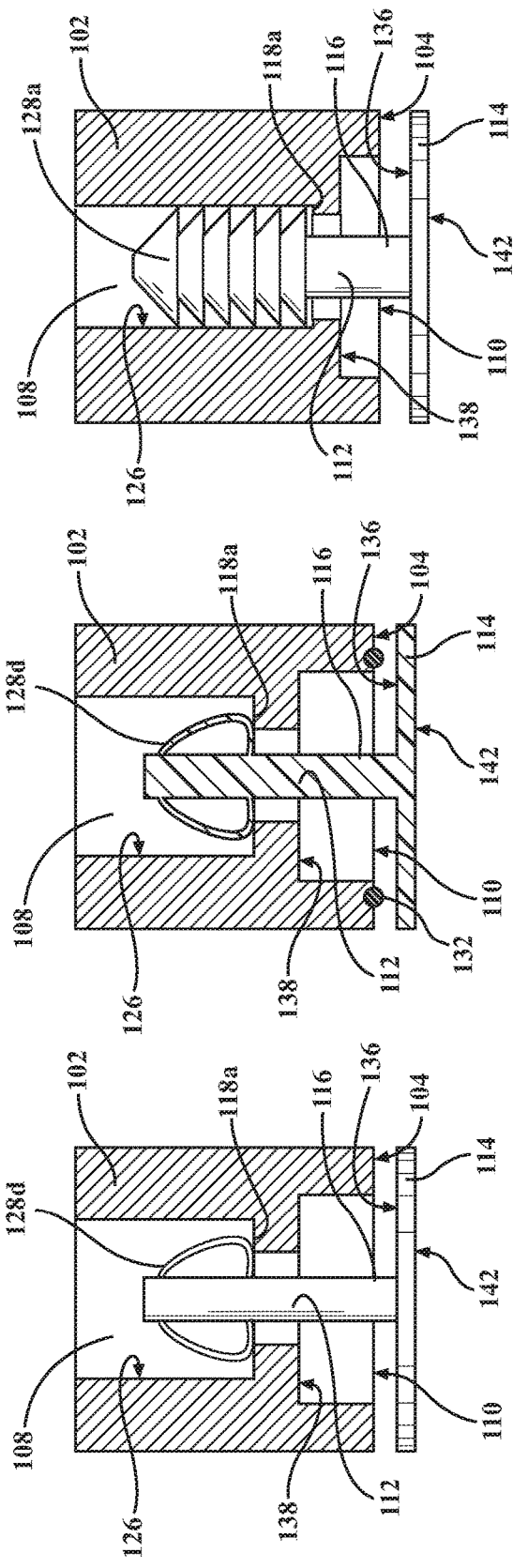

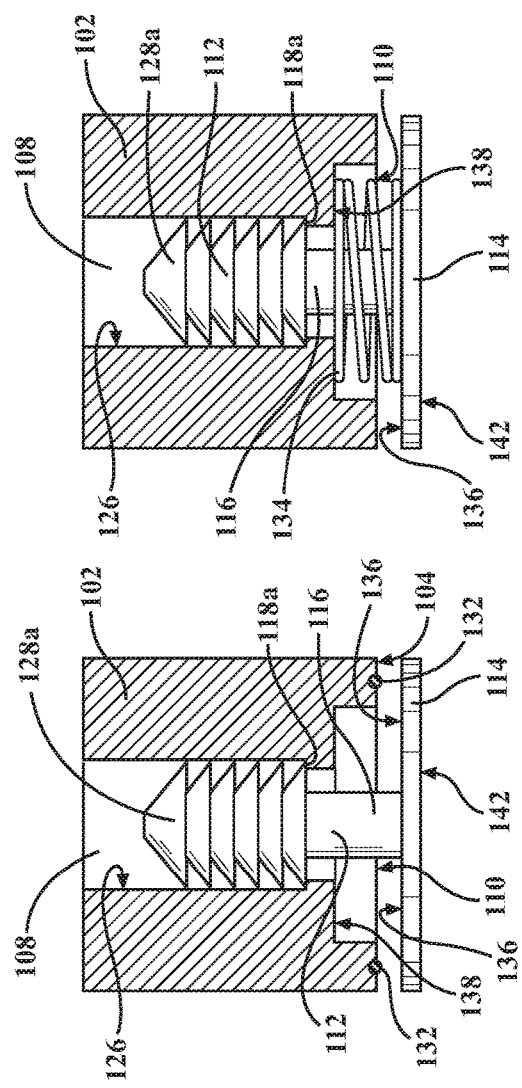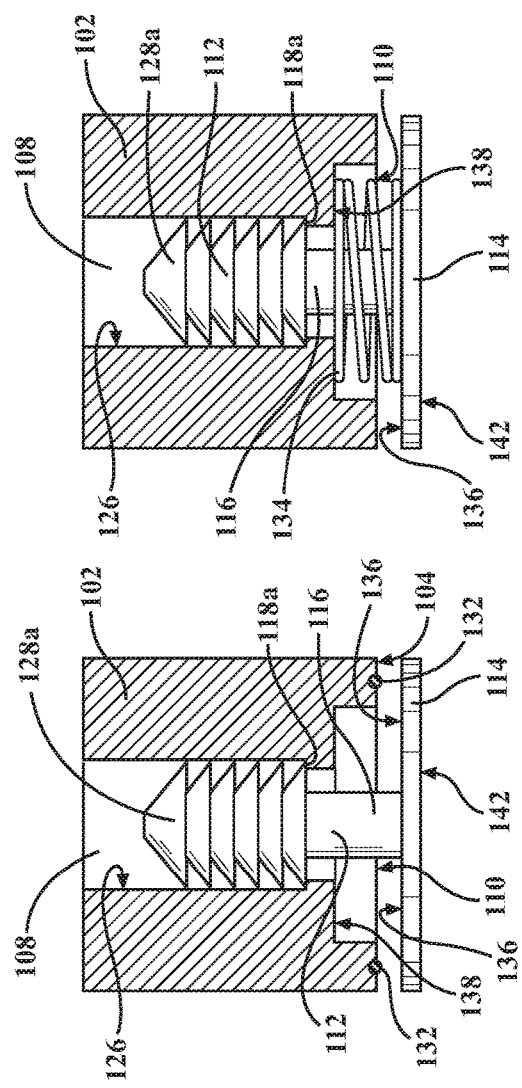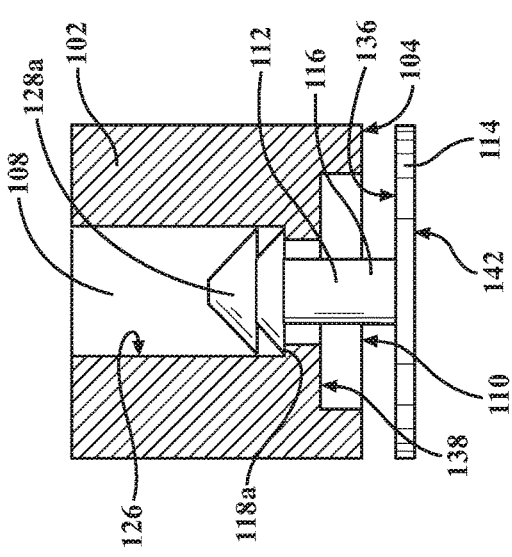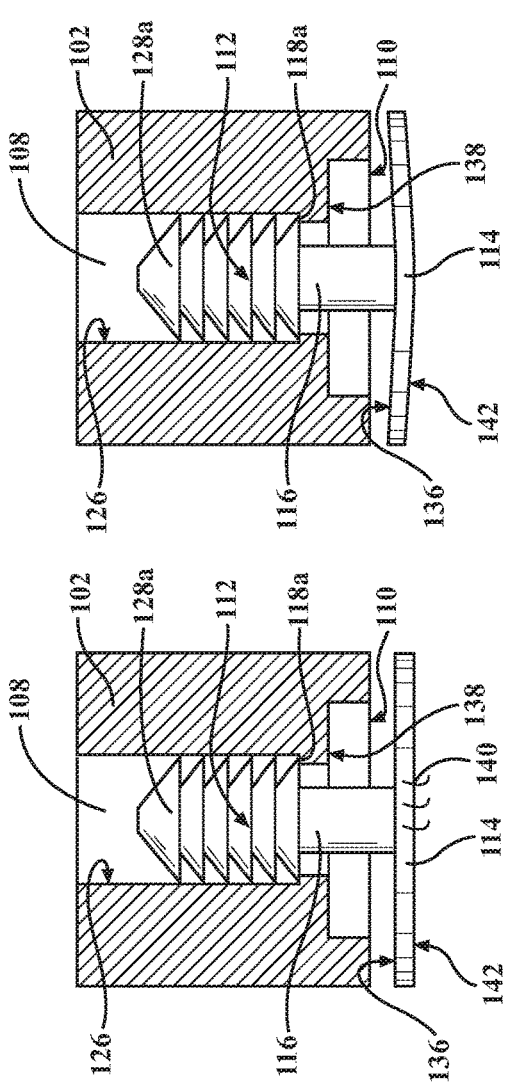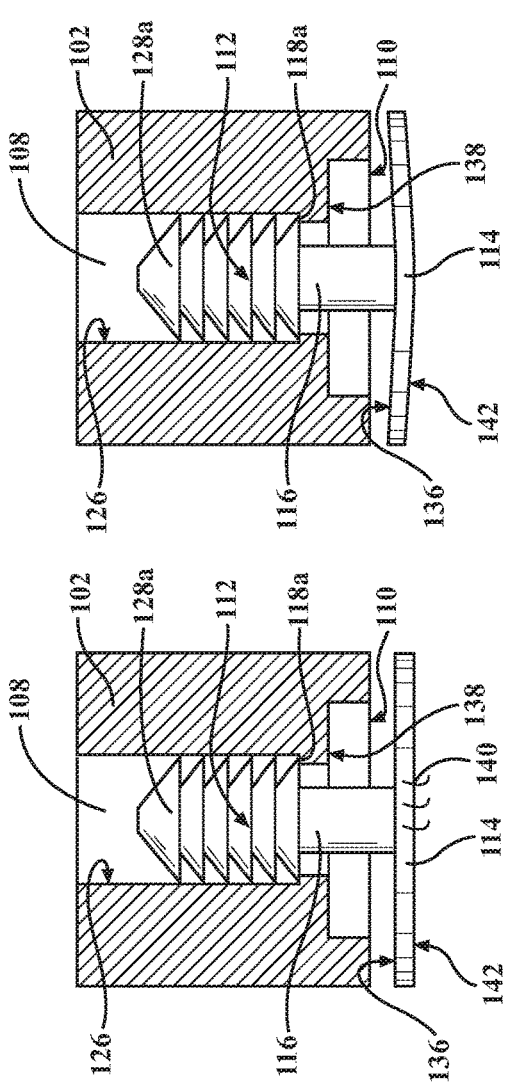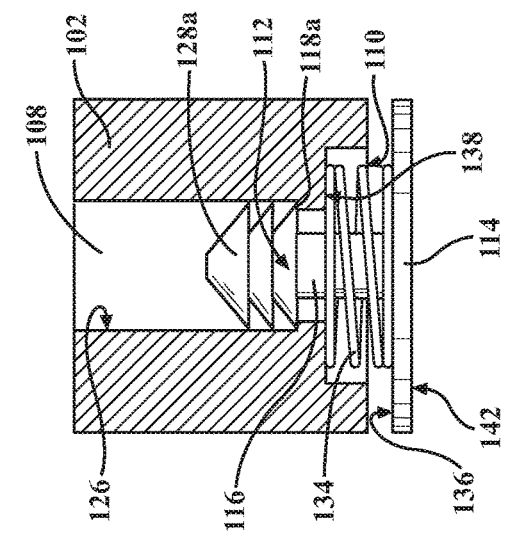

COMPOSITE FOAM ARTICLE

CROSS-REFERENCE TO RELATED APPLICATIONS

The subject patent application is the National Stage of International Patent Application No. PCT/IB2020/051389, filed on Feb. 19, 2020, which claims priority to and all of the benefits of U.S. Provisional Patent Application No. 62/807,292, filed on Feb. 19, 2019, the disclosure of which is hereby incorporated by reference.

FIELD OF THE DISCLOSURE

The subject disclosure generally relates to an assembly for molding a composite article including a foam core and a layer as well as a method of forming the composite foam article with the mold.

DESCRIPTION OF THE RELATED ART

Molded articles formed from polyurethane foam are used in the transportation, furniture, sporting goods, building and construction, and many other industries. For example, in the automotive industry, automotive seats are commonly manufactured with polyurethane cushions that are molded to shape and covered.

As is known in the art, polyurethane foam is formed from the exothermic reaction of an isocyanate-reactive resin composition and an isocyanate in the presence of a blowing agent. The isocyanate-reactive resin composition, the isocyanate, and the blowing agent are collectively known as a polyurethane system.

To make seat cushions, the polyurethane system is mixed and dispensed into a mold, e.g. a clamshell mold, and the polyurethane system reacts and expands to assume the shape of the mold and thus form the molded seat cushion. During the molding process, the mold must be adequately vented to allow excess carbon dioxide ($CO_2$) and other gasses generated by the exothermic reaction as well as the air present in the mold to exit the mold as the polyurethane system reacts and expands. Without adequate venting, molds often yield seat cushions of poor quality, which need to be reworked or even scrapped. Further, inadequate venting often causes manufacturing downtime. As such, the proper venting of molds is an important factor in the efficient production of high-quality molded seat cushions.

Over time, venting solutions have been developed for molds that allow for the efficient production of polyurethane foam articles such as a seat cushion. For example, clamshell molds, such as those used to manufacture seat cushions for the automotive industry, have been designed with various vents in the upper part of the mold (typically opened and closed using a pneumatic cylinder) and with various vents at the part line between the upper and lower parts of the mold.

However, new challenges have arrived. As industry has progressed, automotive seat cushions are now more often co-molded with a layer, e.g. a cloth layer, to provide reinforcement and reduce squeaking at the interface between the polyurethane foam and the seat frame/seat suspension. During the molding process, the layer can be used as a venting aid as gas can enter the cloth from various places in the mold and travel through or behind the cloth on its way to a vent. However, vents located behind cloth must be closed after the cavity has been filled and pressure starts building, otherwise the polyurethane foam may penetrate the cloth and cause any combination of the following problems:

the polyurethane may enter and plug the vent thereby causing the vent to fail and causing manufacturing downtime;

the polyurethane may cause the seat cushion to squeak once incorporated into a seat;

the polyurethane may form an undesirable nib or protrusion on the seat cushion;

the polyurethane may densify and no longer act as a cushioning material; and if the vent fails to close, delayed foam movement into the cloth can cause inconsistent cell structure and variations in foam density—even cause the polyurethane foam to collapse.

To this end, the timely closing of vents, particularly vents in an upper part of the mold are critical to maintain the efficient production of high-quality seat cushions. Various methods have been used to time the closing of a vent. The simplest method is to close the vent a fixed time after the mold is poured or closed. However, variation in the foam process can cause the time requirement to change and force the need to periodically adjust the close time. More complex assemblies and methods, such as those that utilize sensors, e.g. temperature, pressure, or proximity sensors, to sense and close the mold have also been employed. However, such complex sensing systems can be unreliable. Further, if vents are utilized along the parting line, design limitations are consigned on the use of the layer. Namely, the layer cannot be extended out to the edges of the seat cushion because it blocks the parting line vents and reduces foam quality, and even causes manufacturing downtime.

As such, there is a need for a molding assembly that provides adequate venting to allow production of molded composite foam articles including a layer and polyurethane foam such as those used for automotive seats.

SUMMARY OF THE DISCLOSURE AND ADVANTAGES

The subject disclosure provides an assembly for molding a composite article including a foam core and a layer. The assembly includes a mold. The mold has an inner surface and at least partially defines a cavity as well as one or more gas discharge ports; each of the one or more gas discharge ports has a passageway opening proximal to the inner surface of the mold. The mold also has one or more retaining elements. The assembly further includes one or more sealing elements moveably engaged with the mold. Each of the one or more sealing elements includes a head and is shaped to engage the retaining element on the mold in the vented position. Further, each of the one or more sealing elements corresponds with each of the one or more gas discharge ports. During use of the mold, expansion of the foam core with the layer thereon in the mold pushes each of the one or more sealing elements from the vented position to a closed position wherein the head of the sealing element seals the corresponding passageway opening and closes the corresponding gas discharge port. Advantageously, the assembly allows for increased design flexibility and efficient and consistent manufacturing of the composite article.

BRIEF DESCRIPTION OF THE DRAWINGS

The advantages of the present disclosure will be readily appreciated, as the same becomes better understood by reference to the following detailed description when considered in connection with the accompanying drawings. It is to be understood that the drawings are purely illustrative and are not necessarily drawn to scale.

FIGS. 4A-4M are enlarged cross-sectional views of various examples of the sealing element and the retaining elements.

DETAILED DESCRIPTION OF THE DISCLOSURE

Figure 1:
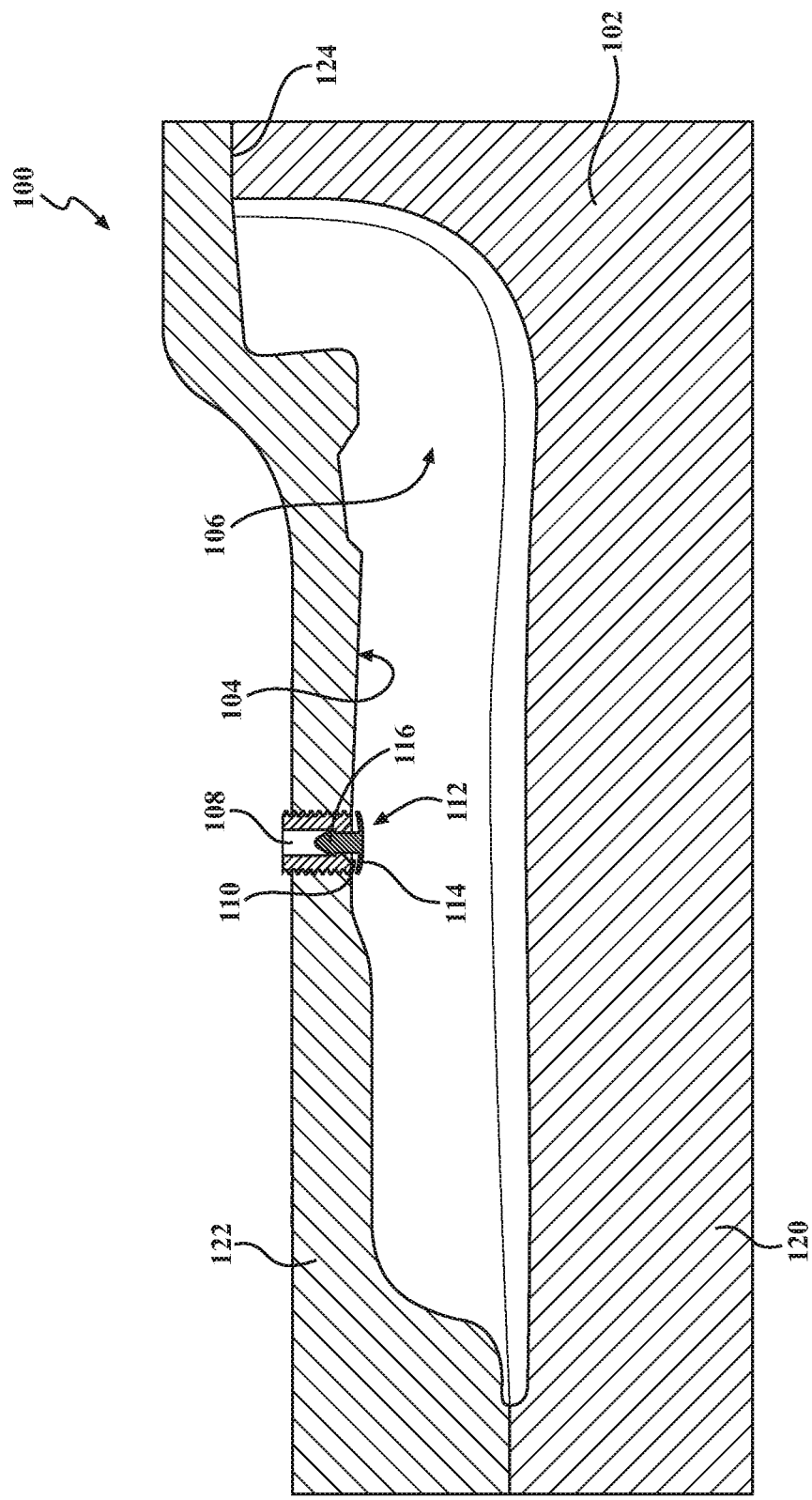
FIG. 1 is a cross-sectional view of an example of an assembly for molding a composite article.

A composite article is disclosed herein and generally shown at 10 throughout the Figures. The composite article 10 includes a foam core 12 (typically comprising polyurethane) presenting a first surface 14 and a second surface 16 facing opposite the first surface 14. The composite article 10 includes a layer 18, which is disposed on the first surface 14 and/or second surface 16 of the foam core 12. The composite article 10 is particularly suitable for use in interior automotive components such as seats.

It should be appreciated that include, includes, and including are the same as comprise, comprises, and comprising when used throughout this disclosure.

Although the composite article 10 of the subject disclosure is particularly useful in the automotive industry, e.g. for use as a seat cushion as described above, the composite article 10 of the subject disclosure is not limited to use in the automotive industry. For example, the composite article 10 is suitable for use in the aerospace industry, e.g. in airplanes, in the furniture industry, and in the sporting goods industry.

As is known in the art, polyurethane foam is formed from the exothermic reaction of an isocyanate-reactive resin composition and an isocyanate in the presence of a blowing agent. The isocyanate-reactive resin composition, the isocyanate, and the blowing agent are collectively known as a polyurethane system.

The foam core 12 typically includes the reaction product of an isocyanate and an isocyanate-reactive component, e.g. an active hydrogen-containing compound such as a polyol, in the presence of a blowing agent. More specifically, the foam core 12 is formed from the exothermic reaction of an isocyanate-reactive resin composition (including the isocyanate-reactive component) and an isocyanate in the presence of a blowing agent. The isocyanate-reactive resin composition, the isocyanate, and the blowing agent are collectively known as a polyurethane system. The foam core 12 can be an isocyanate-based polymer selected from the group of polyurethane, urea-modified polyurethane, and carbodiimide-modified polyurethane. The term "modified", when used in conjunction with a polyurethane means that up to 50% of the polymer backbone forming linkages have been substituted. Suitable polyurethane foams and systems are commercially available from The Woodbridge Group of Woodbridge, ON.

The foam core 12 is described as comprising polyurethane foam which is formed from a polyurethane system. However, it should be appreciated that the scope of this disclosure is not limited to composite foam articles including a foam core 12 comprising polyurethane foam and methods for molding such composite foam articles. It will be apparent to those of skill in the art that the present disclosure is applicable to other types of foam chemistry including, but not limited to, foam cores 12 comprising latex foam, neoprene foam, polyvinyl chloride (PVC) foams and methods therewith.

The subject disclosure provides an assembly 100 for molding the composite article 10 including the foam core 12 and the layer 18. The assembly 100 includes a mold 102. The mold 102 has an inner surface 104 and at least partially defines a mold cavity 106 as well as one or more gas discharge ports 108, each of the one or more gas discharge ports 108 has a passageway opening 110 in fluid communication with the mold cavity 106 of the mold 102. The passageway opening 110 is proximal to the inner surface 104 of the mold 102. The assembly 100 further includes one or more sealing elements 112 moveably engaged with the mold 102. Each of the one or more sealing elements 112 includes a head 114 and is shaped to engage a retaining element 118 on the mold 102. The retaining element 118 can also be referred to as an engagement element 118. Further, each of the one or more sealing elements 112 corresponds with each of the one or more gas discharge ports 108. During use of the mold 102, expansion of the foam core 12 with the layer 18 thereon in the mold 102 pushes each of the one or more sealing elements 112 from a vented position to a closed position wherein the head 114 of the sealing element 112 hermetically seals the corresponding passageway opening 110 and closes the corresponding gas discharge port 108.

The one or more sealing elements 112 typically comprise a polymer. In various examples, the polymer is an elastomer or a thermoplastic elastomer. In many such examples, the elastomer or thermoplastic elastomer exhibits sufficient resilience, flexibility, and other rubber-like physical properties to allow the head 114 of each of the one or more sealing elements 112 to hermetically seal the corresponding passageway opening 110. In other examples, the polymer is a thermoplastic.

In some examples, the one or more sealing elements 112 comprise a rigid polymer (e.g. a thermoplastic) or metal, and a seal (e.g. an O-ring) is used in cooperation with the sealing element 112 to achieve a hermetic seal.

In many examples, the sealing element 112 includes a polymer. Some non-limiting examples of suitable polymers include epoxies, polyurethanes, polyureas, phenolics, polyacrylates, silicones, polysulfides, polyolefins, polyesters, nylons, polyvinylchlorides, latex, styrene-butadiene polymers, nitrile-butadiene polymers, fluoropolymers, mixtures thereof, copolymers thereof, and interpenetrating networks thereof. In many examples, the sealing element 112 includes silicone. Further, in many such examples, the sealing element 112 is of unitary construction and formed via injection molding.

In FIG. 1 is a cross-sectional view of an example of an assembly for molding a composite article is illustrated. More specifically, an example of the mold 102 of the subject disclosure is illustrated. The particular two-part mold configuration illustrated is sometimes referred to as a "clamshell" mold 102 by those of skill in the art. The first part 120 (also known in the art as a "bowl") and the second part 122 (also known in the art as a "lid") are shaped to engage one another and are joined via a conventional hinge or other means (not shown). More specifically, the mold 102 includes the first part 120 and the second part 122 releasingly engageable between an open position and a closed position. In the closed position, as is shown in FIG. 1, the first part 120 and second part 122, when closed, define the mold cavity 106, which corresponds to a desired shape, e.g. the shape of an automotive seat cushion.

In FIG. 1, the first and second parts 120, 122 are engaged to form a parting line 124 where the first and second parts 120, 122 meet. In some examples, the mold 102 includes one or more parting line vents (not shown), each parting line vent providing a passageway for gas to escape. In some such examples, the parting line vents are in fluid communication with a plurality of interconnected grooves disposed about the inner surface 104 of the mold 102 (network venting). Non-limiting examples of such vents are described in U.S. Pat. No. 7,481,637, the contents of which are incorporated by reference herein.

In many examples, the mold 102 is free of parting line vents. The venting system of the subject disclosure (which generally refers to the use of various examples of the sealing element 112 and gas discharge ports 108 disclosed herein) disclosed herein allows for adequate venting without parting line vents. As such, there are fewer design limitations, and the layer 18 can be extended out of the edges of the seat cushion.

Still referring to FIG. 1, the mold 102 includes one gas discharge port 108 defined by a sidewall 126 in said mold 102. As is illustrated, the gas discharge port 108 defines the passageway opening 110 in fluid communication with the mold cavity 106 of the mold 102. The retaining element 118 projects into the gas discharge port 108 (or the passageway of the gas discharge port 108). In the example of FIG. 1, the sidewall 126 of the gas discharge port 108 has the retaining element 118 in the form of a shelf 118a thereon.

Figure 2:
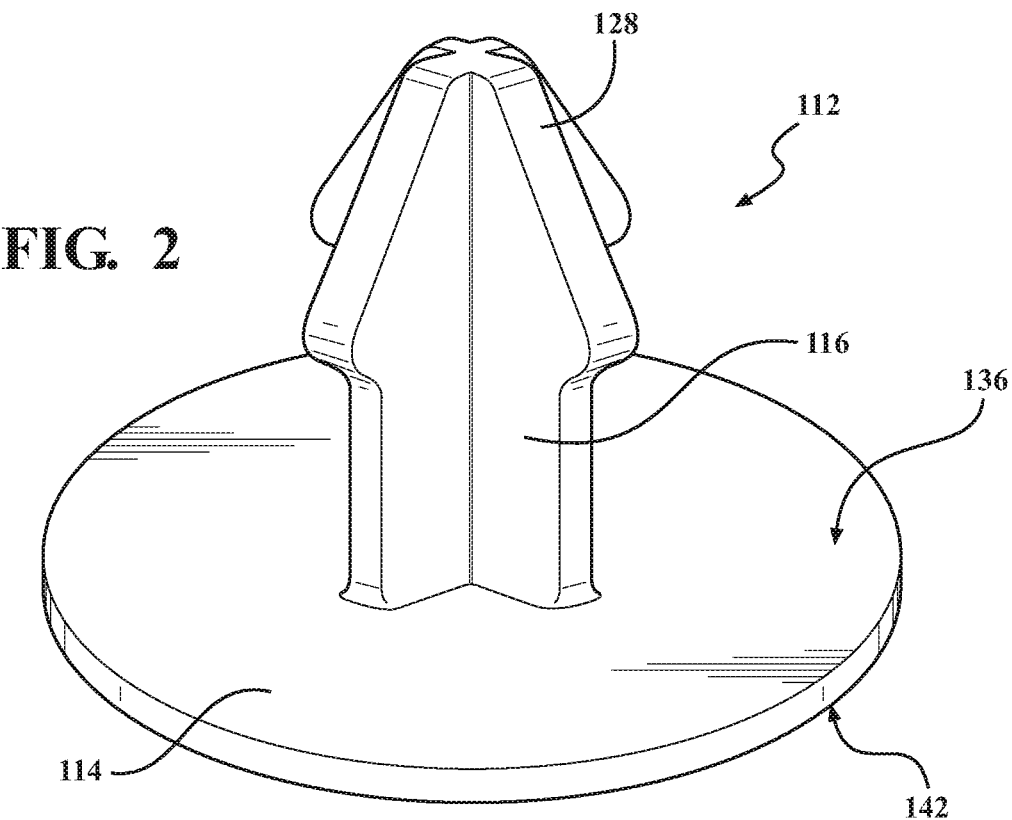
FIG. 2 is an enlarged perspective view of a sealing element that is included in the assembly of FIG. 1.
Figure 3:
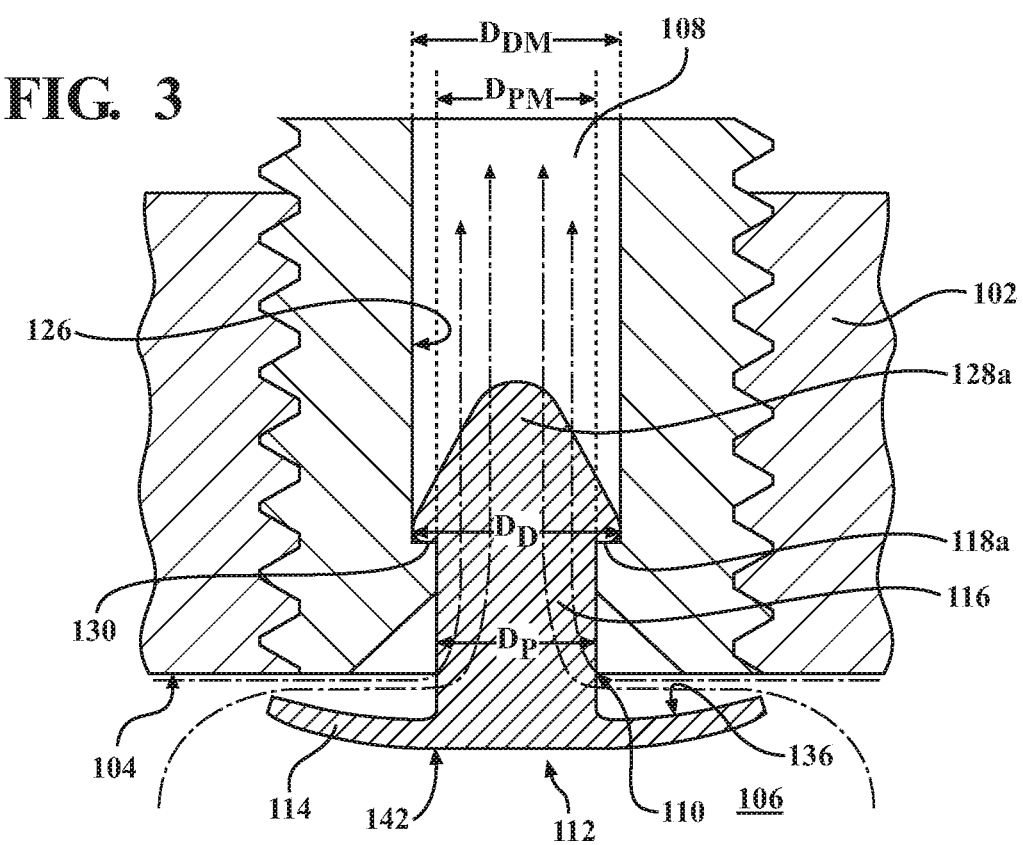
FIG. 3 is an enlarged, isolated cross-sectional view of the sealing element of FIG. 1 in a vented position illustrating venting of the assembly.

FIG. 2 is an enlarged perspective view of the sealing element 112 of the assembly 100 of FIG. 1. As is shown in FIG. 3, the gas discharge port 108 is shaped at a proximal end to have a diameter $D_{PM}$ that is less than a diameter $D_{DM}$ at a distal end of the gas discharge port. For reference, the proximal end of the gas discharge port 108 is located proximal to the inner surface 104 of the mold 102 and the distal end of the gas discharge port is located proximal an exterior surface of the mold 102. Such gas discharge ports 108 can be used in conjunction with the sealing element 112 having a stem 116 that is shaped to have a smaller diameter $D_P$ at a proximal end adjacent said head 114 and a larger diameter $D_D$ at a distal end.

Referring again to FIG. 2, the sealing element 112 includes the head 114 and the stem 116 shaped to engage the retaining element 118 on the mold 102 with a Christmas tree retainer 128a.

In the example of FIGS. 1-3, the Christmas tree retainer 128a has a single discontinuous skirt including 4 portions. Nonetheless, various non-limiting examples of the Christmas tree style retainers are contemplated herein including the Christmas tree retainers 128a having a continuous skirt which continuously extends radially around the stem 116, a discontinuous skirt which has 4 portions as is shown in FIG. 2, or a discontinuous skirt which has 3 portions, etc. In various examples, the Christmas tree retainer 128a of the sealing element 112 can have from 1 to 5 portions, and from 1 to 10, alternatively from 2 to 7 conical skirts. That said, in many examples, regardless of its configuration, the Christmas tree retainer 128a cooperates with the retaining element/shelf 118a in the gas discharge port 108 to enable the venting system to function.

Of course, it should be appreciated that the language "shaped to engage", which in the example of FIG. 1 describes the Christmas tree style retainer 128, can describe various other shaped configurations, some of which are set forth in the example vents of FIG. 4. The stem 116 having the retainer 128 thereon is slidably engaged in the gas discharge port 108 and cooperates with the retaining element 118, e.g. the shelf 118a. Broadly stated, the stem 116 is shaped to engage the retaining element 118 on the mold 102, and the stem is slidably engaged in the gas discharge port 108 and is also slidably engaged with (and cooperates with) the retaining element 118. As illustrated in FIGS. 1 and 2, in the vented position, a base of the Christmas tree style retainer 128a sits on the shelf 118 and the head 114 hangs below the passageway opening 110 to allow excess $CO_2$ and other gasses generated by the exothermic reaction as well as the air present in the mold 102 to exit the mold 102 through the gas discharge port 108 as the polyurethane system reacts and expands.

As the polyurethane system reacts and expands in the mold cavity 106, it pushes the layer 18 towards the inner surface 104 of the mold 102. In turn, the layer 18 pushes the head 114 of the sealing element 112 onto the inner surface 104 of the mold 102 and into the passageway opening 110, wherein the head 114 of the sealing element 112 hermetically seals the corresponding passageway opening 110 and closes the corresponding gas discharge port 108.

During use of the mold 102, expansion of the foam core 12 with the layer 18 thereon in the mold 102 pushes each of the one or more sealing elements 112 from the vented position to the closed position wherein the head 114 of the sealing element 112 hermetically seals the corresponding passageway opening 110 and closes the corresponding gas discharge port 108. As such, the head 114 should have a perimeter or profile that is larger than the perimeter of the passageway opening 110 (notched or not notched) of the gas discharge port 108.

FIG. 3 is an enlarged, isolated cross-sectional view of the sealing element 112 of FIG. 1, which is in the vented position with the arrows representing the airflow out of the mold 102 or venting of the mold 102. In other words, when the sealing element 112 is in the vented position, the mold cavity 106 is in fluid communication with the air outside of the mold 102 via the gas discharge port 108 and venting of the mold cavity 106 of the mold 102 proceeds. When the composite article 10 is formed and the sealing element 112 is pushed into the passageway opening 110 to hermetically seal and close the corresponding gas discharge port 108, fluid communication is suspended and venting of the mold 102 ceases.

Still referring to FIG. 3, it should be appreciated the language "shaped to engage", which in the example of FIG. 3 refers to the Christmas tree retainer 128a, can also refer to various other shaped configurations and is not limited to a Christmas tree retainer 128a. Likewise, the language "the retaining element" 118, which in the example of FIG. 3 refers to the shelf 118a, can also refer to various other shaped configurations and is not limited to a shelf 118a. Many examples of the subject assembly 100 include the sealing element 112 wherein the stem 116 is shaped to have a smaller diameter $D_P$ at a proximal end and a larger diameter $D_D$ at a distal end, and the gas discharge port 108 is integrated with the retaining element 118 and is shaped at a proximal end to have a diameter $D_{PM}$ greater than the diameter of the proximal $D_P$ end of the sealing element 112. The gas discharge ports 108 can be used in conjunction with the sealing element 112 having a stem 116 that is shaped to have a smaller diameter at a proximal end adjacent said head 114 and a larger diameter at a distal end.

Figure 10:
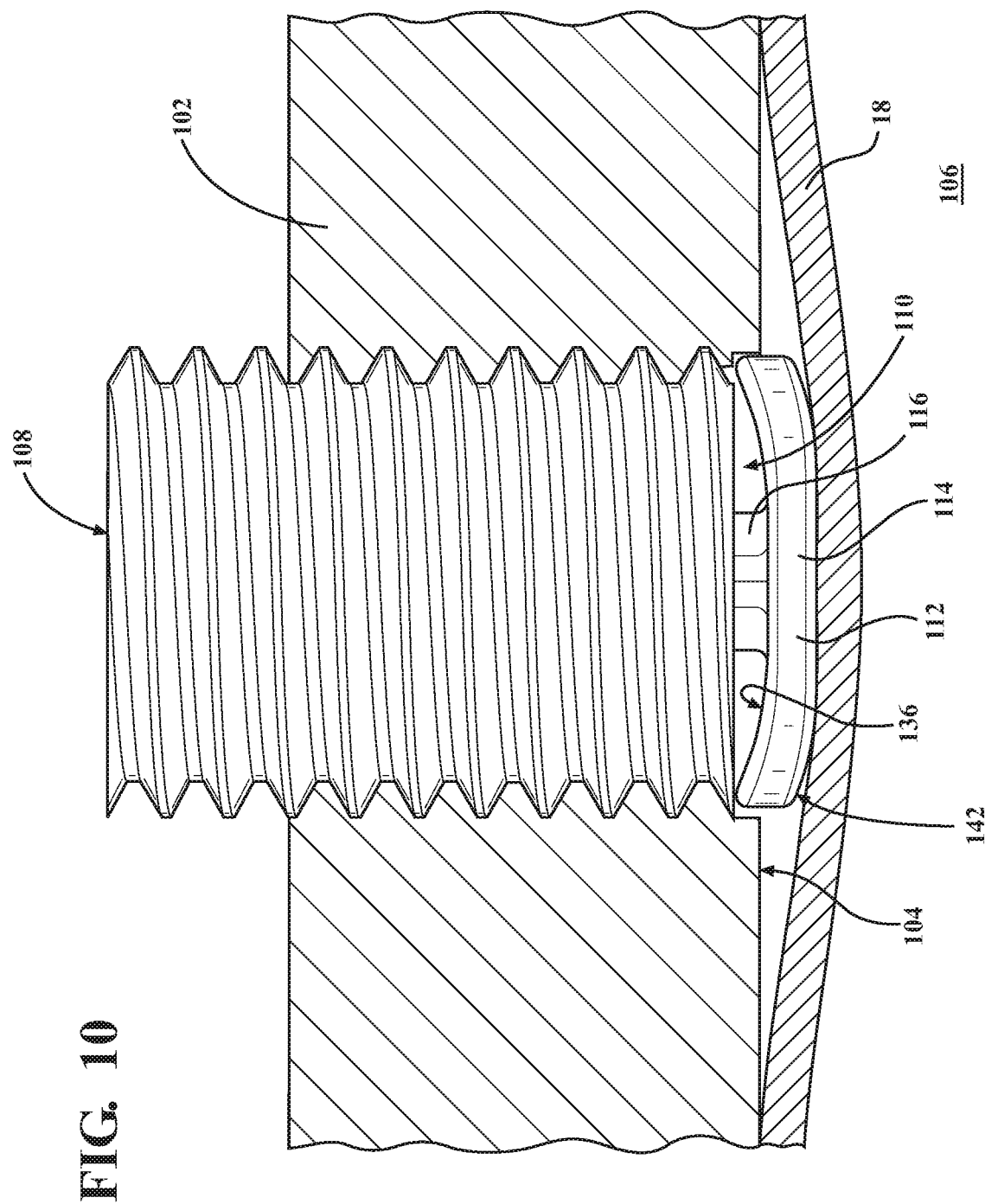
FIG. 10 is a cross-sectional view of the layer of the composite article pushing against the head of the sealing element.

Referring now to FIG. 10, an isolated cross-sectional view of the sealing element 112 is illustrated with the layer 18 abutting an outer surface 142 of the head 114 thereby pushing the sealing element 112 into the gas discharge port 108 and cutting off fluid communication to cease venting of the mold 102. In FIG. 10, just like in FIG. 3, the gas discharge port 108 is formed with a threaded insert (not numbered). Also, in FIG. 10, the passageway opening 110 of the gas discharge port 108 is notched to a depth where the head 114 of the sealing element 112 "stands proud" of the inner surface 104 of the mold 102.

Various non-limiting examples of the sealing element 112 and the retaining element 118 are illustrated in the examples of FIGS. 4A-4M. More specifically, FIGS. 4A-4M are partial cross-sectional views of various examples of the sealing element 112 and the retaining element 118 which can be mixed and matched in any combination to arrive at the venting solution of this disclosure.

In a typical example, the gas discharge port 108 has a circular cross-sectional profile. In other words, the gas discharge port 108 is a tubular cavity having a circular cross-sectional profile that is formed in the mold 102. Of course, the gas discharge port 108 is not limited to a circular cross-sectional profile (or tubular cavity). In various examples, the gas discharge port 108 has an elliptical, rectangular, or triangular cross-sectional profile. In some examples, the gas discharge port 108 includes portions having different shapes (e.g. a gas discharge port 108 having a first portion with a circular cross-sectional profile, and a second portion with a rectangular cross-sectional profile). In some examples, the gas discharge port 108 includes portions having different sizes (e.g. a gas discharge port 108 having a first portion with a circular cross-sectional profile having a first diameter, and a second portion with a circular cross-sectional profile having a second diameter which is different than (greater than or less than) the first diameter).

In many examples such as that of FIG. 1, the gas discharge port 108 has a circular cross-sectional profile and a diameter that changes. For example, with reference to FIG. 3, the gas discharge port 108 corresponds with the retaining element 118a and is shaped at a proximal end to have a diameter $D_{PM}$ that is less than a diameter $D_{DM}$ of a distal end of the gas discharge port 108. That is, the gas discharge port 108 of the example of FIG. 1 has a narrow portion, and a wide portion. In some examples, such as the example of FIG. 1, when the gas discharge port 108 includes portions of different diameter, the transition between the two or more portions of different diameter is stepped at a 90° angle to define a shelf or step perpendicular to the sidewall 126 of the gas discharge port 108. In other examples, the transition between portions of different diameter is gradual or tapered, e.g. at 45° to the sidewall 126 of the gas discharge port 108. Of course, in the vented position, the retaining element 118a of the sealing element 112 sits on the shelf.

Figure 4M:
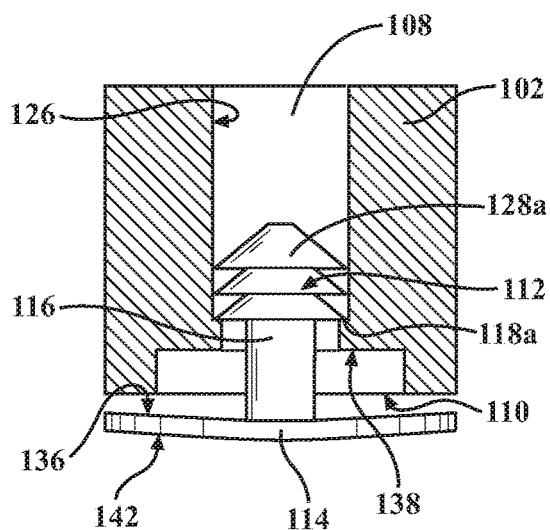

In some examples, the gas discharge port 108 does not change size or shape at the passageway opening 110. In other examples, a notch is recessed in the inner surface 104 of the mold 102 and in fluid communication with the passageway opening 110 of said gas discharge port 108. FIGS. 3, 4A, and 4B illustrate examples of the gas discharge port 108 that do not change size or shape at the passageway opening 110, wherein the passageway opening 110 of the gas discharge port 108 is not notched. However, in other examples, such as those illustrated in FIGS. 4C-4M, the passageway opening 110 of the gas discharge port 108 is notched. The notch can be formed of different shapes and sizes and can extend various depths, e.g. from 0.1 to 4 mm, along a longitudinal axis of the gas discharge port 108 into the second part 122 of the mold 102. The notched passageway opening 110 can be beveled, e.g. formed with walls at a 45° angle relative to the longitudinal axis of the gas discharge port 108, as is illustrated in FIG. 4C. The notch can be formed with walls substantially parallel to the longitudinal axis of the gas discharge port 108, as is illustrated in FIGS. 4D-4L. The examples of FIGS. 3, 4A, and 4B illustrate the passageway opening 110 that is not notched.

FIG. 4A illustrates an enlarged cross-sectional view of an example of the assembly 100 including the hinged sealing element 112 and the gas discharge port 108 having a uniform circular cross-sectional profile from the passageway opening 110 extending longitudinally to its proximal end, which opens to the exterior of the mold 102. FIG. 4A illustrates the sealing element 112 with the hinge 118b as opposed the Christmas tree retainer 128a and shelf 118a illustrated in FIGS. 1-3. The retaining element 118 of this example is a hinge 118b on the inner surface 104 of the mold 102 located proximal to the passageway opening 110 of the gas discharge port 108. Of course, the sealing element 112 is shaped to engage the hinge 118b on the mold 102 with an appropriate retainer 128b.

The sealing element 112 of FIG. 4A includes the head 114 and is shaped to engage the hinge 118b. The sealing element 112 is moveably engaged with the mold 102. During use of the mold 102, expansion of the foam core 12 with the layer 18 thereon in the mold 102 pushes each of the hinged sealing elements 112 from the vented position (hanging down via the force of gravity) to the closed position wherein the head 114 of the sealing element 112 is pushed upward to hermetically seal the passageway opening 110 and close the gas discharge port 108. Of course, in the vented position, the head 114 of the sealing element 112 hangs below the passageway opening 110 to allow excess $CO_2$ and other gasses generated by the exothermic reaction as well as the air present in the mold 102 to exit the mold 102 through the gas discharge port 108 as the polyurethane system reacts and expands, but pushed upward in timely fashion to seal the mold 102 and produce the composite article 10 of high quality.

In some examples, the one or more engagement slots 118 define an opening in the inner surface 104 of the mold 102 outside of the passageway opening and each of said one or more sealing elements 112 comprises one or more stems 116 which cooperate with the one or more engagement slots 118. In such embodiments, each of the one or more gas discharge ports 108 is located proximal to the one or more retaining elements 118 including engagement slots 118c defining an opening in the inner surface 104 of the second part 122 of the mold 102. Each of the one or more sealing elements 112 includes one or more stems 116, which cooperate with the one or more engagement slots 118c. In some examples, such as the example of FIG. 4B, each of the one or more engagement slots 118c define an opening in the inner surface 104 of the mold 102 that does not extend to an exterior of the mold 102. In other examples, not shown, the one or more engagement slots 118c define an opening in the inner surface 104 of the mold 102 and a cavity that extends to the exterior of the mold 102.

FIG. 4B illustrates one such example of the assembly 100 including the sealing element 112 including the head 114 and multiple stems 116, which cooperate with the multiple engagement slots 118c. The gas discharge port 108 of this example is proximal to the engagement slots 118c and generally centered with respect to the head 114 (the head 114 is generally centrally located on the longitudinal axis of the gas discharge port 108). In this example, the stem 116 has a hook 128c and is thus shaped to engage the retaining element 118/notched engagement slots 118c and designed to cooperate with the notch in the engagement slot 118c. In this example, the gas discharge port 108 has a uniform circular cross-sectional profile from the passageway opening 110 extending longitudinally towards its proximal end, which opens to the exterior of the mold 102. The retaining element 118 is the notched engagement slots 118c located on the inner surface 104 of the mold 102 proximal to the passageway opening 110 of the gas discharge port 108. Like FIG. 4A and in contrast to the example of FIG. 1, FIG. 4B illustrates an engagement slot 118c which is not integral with the gas discharge port 108.

Still referring to FIG. 4B, the sealing element 112 is moveably engaged with the mold 102. During use of the mold 102, expansion of the foam core 12 with the layer 18 thereon in the mold 102 pushes the sealing element 112 from the vented position (hanging down via the force of gravity with the hooked stem resting at the bottom of the notch in the engagement slot 118c) to the closed position wherein the head 114 of the sealing element 112 is pushed up (with the hooked stem forced upward to the top of the notch in the engagement slot 118c) and hermetically seals the passageway opening 110 and closes the gas discharge port 108. Of course, in the vented position, the head 114 of the sealing element 112 hangs below the passageway opening 110 to allow excess $CO_2$ and other gasses generated by the exothermic reaction as well as the air present in the mold 102 to exit the mold 102 through the gas discharge port 108 as the polyurethane system reacts and expands, but pushed upward into the passageway opening 110 in timely fashion to seal the mold 102 and produce a composite article 10 of high quality.

Figure 5A:
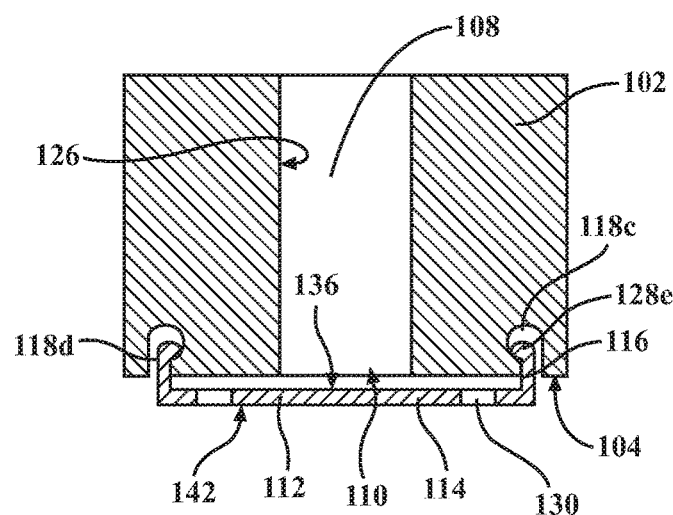
FIG. 5A is an enlarged cross-sectional view of an example of a particular sealing element and a corresponding retaining element.
Figure 5B:
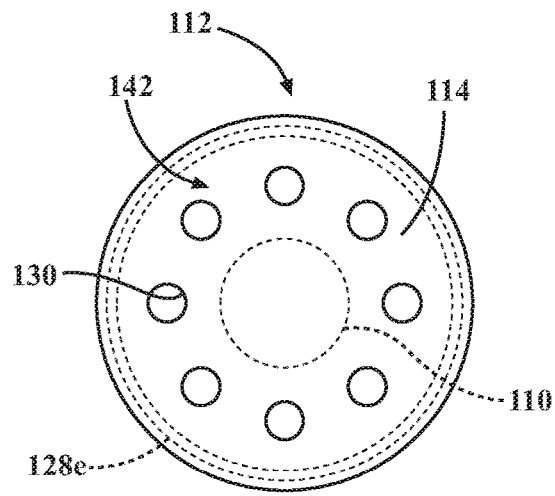
FIG. 5B is a top view of a head of the sealing element of FIG. 5A.

Referring now to FIGS. 5A and 5B, and example of the venting system of the subject disclosure is shown which is similar to the example of FIG. 4B but instead of the sealing element 112 which includes multiple stems 116, which cooperate with the multiple engagement slots 118c, the head 114 of the sealing element 112 of this example is "shaped to engage" the mold surface with a radial retainer 128e, which cooperates with a radial slot 118d in the inner surface 104 of the mold 102. The passageway opening 110 of the gas discharge port 108 of this example is framed by the radial slot 118d. Further, the passageway opening 110 of the gas discharge port 108 of this example is generally centered with respect to the head 114 (the head 114 is generally centrally located on the longitudinal axis of the gas discharge port 108). Furthermore, the head 114 includes one or more apertures 130, which are located such that they do not overlap with the passageway opening 110. When the sealing element 112 is in the vented position, a hook of the radial retainer 128e sits on the shelf of the radial slot 118d, and the head 114 hangs below the passageway opening 110 to allow excess $CO_2$ and other gasses generated by the exothermic reaction of the polyurethane system as well as the air present in the mold 102 to enter into the one or more apertures 130, flow between the inner surface 104 of the mold 102 and the inner surface 136 of the head 114, and to exit the mold 102 through the gas discharge port 108. As the polyurethane system reacts and expands in the mold cavity 106, it pushes the layer 18 towards the inner surface 104 of the mold 102. In turn, the layer 18 pushes the head 114 of the sealing element 112 onto the inner surface 104 of the mold 102, the apertures 130 are sealed/plugged and so is the passageway opening 110, wherein the head 114 of the sealing element 112 is engaged and the vent system is closed.

FIG. 4C is a close-up cross-sectional view of an example of the assembly 100 having the shelved 118a gas discharge port 108 and the sealing element 112 including the head 114 having a circular profile at a proximal end of the single stem 116 and the Christmas tree retainer 128a at a distal end of the stem 116. Like the example of FIG. 1, the Christmas tree retainer 128a cooperates with the retaining element/shelf 118a in the gas discharge port 108, i.e., the narrowing of the diameter $D_{PM}$ of the gas discharge port 108 at its proximal end. In this example, the passageway opening 110 of the gas discharge port 108 is notched with beveled edges. Further, the head 114 having a circular profile has an outer edge that is profiled to mate with the beveled edges of the notched passageway opening 110 of the gas discharge port 108. Of course, the subject disclosure contemplates various such examples where the edges of the notched passageway opening 110 mate with the outer profile of the head 114 of the sealing element 112.

Still referring to FIG. 4C, the sealing element 112 is moveably engaged within the gas discharge port 108 in the mold 102. During use of the mold 102, expansion of the foam core 12 with the layer 18 thereon pushes sealing element 112 from the vented position (hanging down via the force of gravity with the bottom conical skirt of the Christmas tree retainer 128a resting on the retaining element/shelf 118a in the gas discharge port 108) to the closed position wherein the head 114 of the sealing element 112, the stem 116, and the Christmas tree retainer 128a are forced upward such that the head 114 of the sealing element 112 hermetically seals the passageway opening 110 and closes the gas discharge port 108.

Referring now to FIG. 4D, a close-up cross-sectional view of an example of the assembly 100 having the shelfed 118a gas discharge port 108 and the sealing element 112 including the head 114 having a circular profile at a proximal end of the single stem 116 and a bow retainer 128d at a distal end of the stem 116 is illustrated. Like the example of FIG. 4C, the bow retainer 128d cooperates with the retaining element/shelf 118a in the gas discharge port 108. In this example, the passageway opening 110 of the gas discharge port 108 is notched, the notch having a circular profile with squared edges. The head 114 has a circular profile, which extends past the circular perimeter of the notched passageway opening 110. The subject disclosure contemplates various examples where the head 114 does not mate with, but extends past, the perimeter of the passageway opening 110 (notched or not) a distance from about 0.1 to about 10, alternatively from about 1 to about 5, mm past the perimeter of the passageway opening 110.

Still referring to FIG. 4D, the sealing element 112 is moveably engaged within the gas discharge port 108 in the mold 102. During use of the mold 102, expansion of the foam core 12 with the layer 18 thereon pushes the sealing element 112 from the vented position (hanging down via the force of gravity with the bottom of the bow retainer 128d resting on the retaining element/shelf 118a in the gas discharge port 108) to the closed position wherein the head 114 of the sealing element 112, the stem 116, and the bow retainer 128d are forced upward such that the head 114 of the sealing element 112 hermetically seals the passageway opening 110 and closes the gas discharge port 108.

Referring now to FIG. 4E, a close-up cross-sectional view of an example of the assembly 100 having the shelfed 118a gas discharge port 108 and the sealing element 112 including the head 114 having a circular profile at a proximal end of the single stem 116 and a bow retainer 128d at a distal end of the stem 116 is illustrated. FIG. 4E is just like the example of FIG. 4D, but the sealing element 112 is formed from a more rigid polymer (hence the different hashing than FIG. 4D) and the head 114 cooperates with a seal (an O-ring 132) when in the closed position to seal the passageway opening 110 and closes the gas discharge port 108. It should be appreciated that the O-ring 132 shown in FIG. 4E could can be located on the inner surface 136 of the head 114 as opposed to being located on the inner surface 104 of the mold 102 as shown in FIG. 4E.

Referring now to FIG. 4F, a close-up cross-sectional view of an example of the assembly 100 having the shelfed 118a gas discharge port 108 and the sealing element 112 including the head 114 having a circular profile at a proximal end of the single stem 116 and the Christmas tree retainer 128a at a distal end of the stem 116 is illustrated. In this example, the Christmas tree retainer 128a has six conical skirts (in contrast to the three conical skirts of the Christmas tree retainer 128a of the sealing element 112 of FIG. 4C). Christmas tree retainer 128a cooperates with the retaining element/shelf 118a in the gas discharge port 108. Further, the passageway opening 110 of the gas discharge port 108 is notched, the notch having a circular profile with squared edges. The head 114 has a circular profile, which extends past the circular perimeter of the notched passageway opening 110.

Still referring to FIG. 4F, the sealing element 112 is moveably engaged within the gas discharge port 108 in the mold 102. The sealing element 112 is held in position via gravity in the vented position. During use of the mold 102, expansion of the foam core 12 with the layer 18 thereon pushes the sealing element 112 from the vented position (hanging down via the force of gravity with the bottom conical skirt of the Christmas tree retainer 128a resting on the retaining element/shelf 118a in the gas discharge port 108) to the closed position wherein the head 114 of the sealing element 112, the stem 116, and the Christmas tree retainer 128a are forced upward such that the head 114 of the sealing element 112 hermetically seals the passageway opening 110 and closes the gas discharge port 108.

Referring now to FIG. 4G, a close-up cross-sectional view of an example of the assembly 100 having the shelfed 118a gas discharge port 108 and the sealing element 112 including the head 114 having a circular profile at a proximal end of the single stem 116 and the Christmas tree retainer 128a at a distal end of the stem 116 is illustrated. In this example, the Christmas tree retainer 128a has two conical skirts (in contrast to the six conical skirts of the Christmas tree retainer 128a of the sealing element 112 of FIG. 4F). Like the example of FIG. 4G, the Christmas tree retainer 128a cooperates with the retaining element/shelf 118a in the gas discharge port 108. In this example, the passageway opening 110 of the gas discharge port 108 is notched, the notch having a circular profile with squared edges. Further, the head 114 has a circular perimeter, which extends past the circular perimeter of the notched passageway opening 110.

Still referring to FIG. 4G, the sealing element 112 is moveably engaged within the gas discharge port 108 in the mold 102. During use of the mold 102, expansion of the foam core 12 with the layer 18 thereon pushes the sealing element 112 from the vented position (hanging down via the force of gravity with the bottom conical skirt of the Christmas tree retainer 128a resting on the retaining element/shelf 118a in the gas discharge port 108) to the closed position wherein the head 114 of the sealing element 112, the stem 116, and the Christmas tree retainer 128a are forced upward such that the head 114 of the sealing element 112 hermetically seals the passageway opening 110 and closes the gas discharge port 108.

The assembly 100 of the example of FIG. 4H includes the shelfed 118a gas discharge port 108 and the sealing element 112 including the head 114 having a circular profile at a proximal end of the single stem 116 and the Christmas tree retainer 128a at a distal end of the stem 116. The assembly 100 of FIG. 4H is just like that of FIG. 4F with the exception being that the O-ring 132 is embedded in the inner surface 104 of the mold 102 about the perimeter of the passageway opening 110. FIG. 4E similarly utilizes the O-ring 132 too. In the closed position, the head 114 of the sealing element 112 rests against the O-ring 132 to facilitate a hermetical seal when the head 114 of the sealing element 112 is in the closed position. In some examples, the sealing element 112 is held in the vented position or biased via a biasing element 134 such as a spring. The assembly 100 of the example of FIG. 4I includes the shelfed 118a gas discharge port 108 and the sealing element 112 including the head 114 having a circular profile at a proximal end of the single stem 116 and the Christmas tree retainer 128a at a distal end of the stem 116. The assembly 100 of FIG. 4I is just like that of FIG. 4H with the exception being that the sealing element 112 is spring loaded in the vented position (as opposed to being gravity loaded) with a spring 134 which is disposed between an inner surface 136 of the head 114 and a bottom surface 138 of the notched passageway opening 110. The assembly 100 of FIG. 4J is just like that of FIG. 4I with the exception being that the Christmas tree retainer 128a of FIG. 4J includes only three conical skirts rather than the six conical skirts included in the Christmas tree retainer 128a of FIG. 4I.

It should be appreciated that any of the elements of the example of FIGS. 4A-4M can be mixed and matched to arrive at the assembly 100 of this disclosure. To this end, the various sealing elements 112 disclosed and contemplated herein can be gravity loaded or spring loaded. Either way, especially in examples in which the sealing element 112 is gravity loaded, the weight of the sealing element 112 may vary.

In various examples, the weight of the sealing element 112 is greater than about 0.2, greater than about 0.3, greater than about 0.4, greater than about 0.5, from about 0.2 to about 30, from about 0.4 to about 15, or from about 0.5 to about 10, grams. In various non-limiting examples, all values and ranges of values including and between those described above are hereby expressly contemplated for use herein.

The assembly 100 of FIG. 4K is just like that of FIG. 4H with the exception being that the sealing element 112 includes a fastener 140, e.g. hooks (hook with loops on the head 114), adhesive, etc., on the outer surface 142 of its head 114. The fastener 140 is configured to releasably connect with the layer 18. As such, the fastener 140 facilitates contact between the layer 18 of the composite article 10 and the sealing element 112 during use of the assembly 100. In other words, in this example, the fastener 140 (or hooks thereof) attaches to the layer 18 so when the mold lid opens/disengages, the hooks are pulled by the layer 18 causing sealing element 112 to be pulled down away from the gas discharge port 108 such that the head 114 of the sealing element 112 is pulled away from the passageway opening 110 and venting is opened in preparation for the mold's 102 next use.

It should be appreciated that this concept of including a hook fastener(s) (e.g. a Velcro like surface) on the outer surface 142 of the head 114 which is configured to releasably connect with the layer can be used in any example sealing element 112 described herein.

The assembly 100 of FIG. 4L is just like that of FIG. 4H with the exception being that the sealing element 112 of FIG. 4L includes the head 114 which is contoured or bowed rather than straight. The bowed head 114 causes the seal to break when pressure is released from the head 114. During use of the assembly 100, this example of the head 114 facilitates contact and a robust hermetic seal between the inner surface 136 of the head 114 and the inner surface 104 of the mold 102 via resilience imparted on the head 114 via the contour. The assembly 100 of FIG. 4L is just like that of FIG. 4L with the exception being that the Christmas tree retainer 128a of FIG. 4M includes only three conical skirts rather than the six conical skirts included in the Christmas tree retainer 128a of FIG. 4L. It should be appreciated that the various sealing elements 112 disclosed and contemplated herein can have the sealing element 112 having the head 114 having various thicknesses. Thickness impacts performance, because the weight of the sealing element 112 is critical to function in consideration of mold 102 pressures. With respect to polymeric sealing elements (e.g. comprising silicone), a head 114 having a thickness of 1 mm can be too light, causing early closure of the vent which results in underfill of the mold cavity 106, which causes poor quality composite articles 10 (e.g. seat cushions) and even scrap composite articles 10. However, the head 114 having a thickness of 2, 3, or 4, mm silicone performs well to produce high quality composite articles 10.

The head 114 typically has a thickness of greater than 0.25 mm. That said, in various examples, the head 114 has a thickness of from about 0.25 to about 6, from about 0.5 to about 4, from about 1.5 to about 4, from about 0.75 to about 3, from about 1.5 to about 3, mm. Referring now to FIGS. 9A-D, the sealing element 112 having the head 114 having a thickness of 1 mm (9A), 2 mm (9B), 3 mm (9C) and 4 mm (9D) are illustrated. In various non-limiting examples, all values and ranges of thickness values including and between those described above are hereby expressly contemplated for use herein.

From a problem solution perspective, embodiments of the sealing element 112, retaining element 118, and the gas discharge port 108 that are gravity activated (the sealing element 112 is held in the vented position via gravity), have sufficient weight, and comprise an elastomer such as silicone eliminate the need for electrically timed venting on molds which can be problematic. Further, such embodiments of the sealing element 112 remain moveably engaged the gas discharge port 108 and function efficiently over a number of use cycles because such sealing elements 112 exhibit surface characteristics such as a coefficient of friction and surface energy associated with elastomers such as silicone that facilitate prolonged use. Stated simply, such engagement elements work efficiently over as long period of time without gumming up and causing venting problems and ultimately quality problems with the composite article 12.

Figure 6:
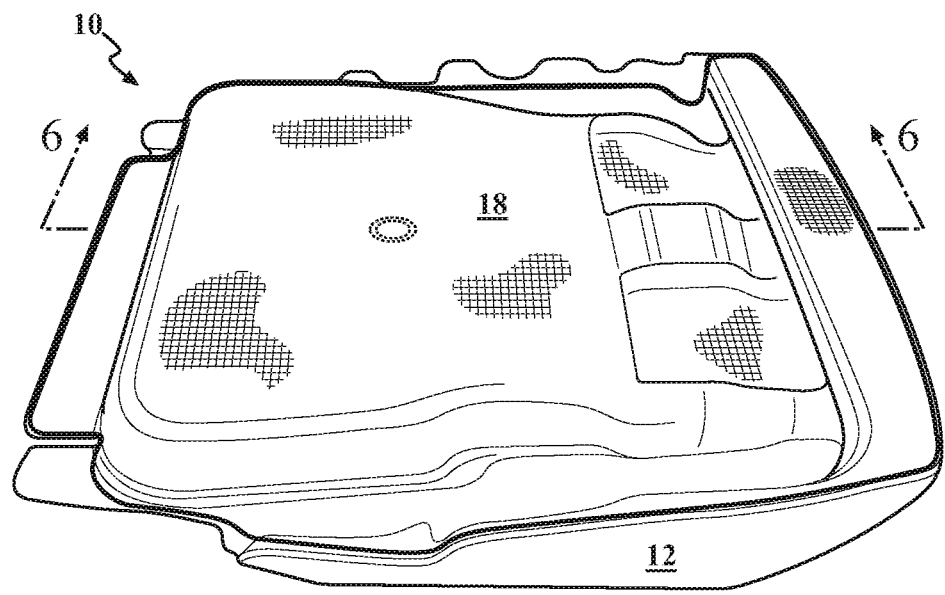
FIG. 6 is a perspective view of an example of the composite article formed with the assembly and method disclosed herein.
Figure 7:
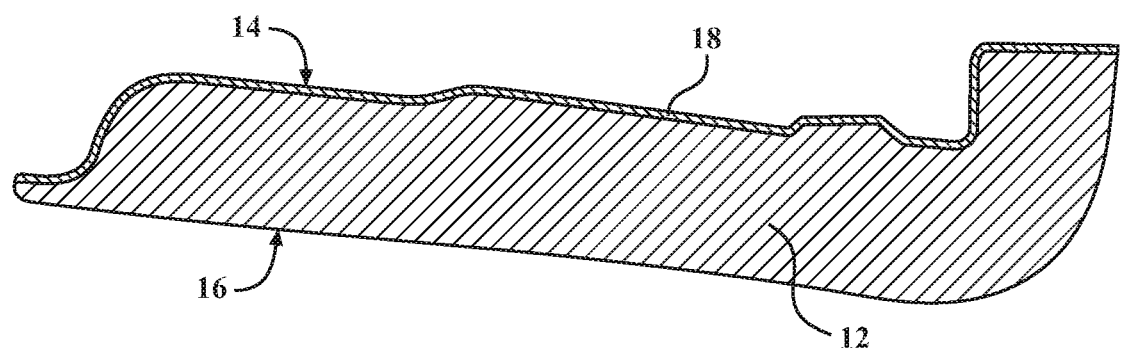
FIG. 7 is a cross-sectional view of the composite article of FIG. 6 shown along line 6-6.

Referring now to FIG. 6, the composite article 10 formed with the assembly 100 is also disclosed herein. FIG. 7 is a cross-sectional view of the composite article 10 of FIG. 6 shown along line 6-6. The composite article 10 includes the foam core 12 presenting the first surface 14 and the second surface 16 facing opposite the first surface 14. The foam core 12 of the composite article 10 typically includes polyurethane and can also be referred to as a polyurethane foam core 12. Various polyurethane foam and systems therefore are described above.

Referring now to FIG. 6, the composite article 10 also includes the layer 18. The layer 18 can include various materials including cloth comprising natural and/or synthetic fibers and single piece polymeric materials. The layer 18 can be permeable or impermeable (non-permeable), woven, non-woven, or a polymeric film.

Of course, the layer 18 can include multiple sub-layers. If included, the sub-layers can be compositionally the same or compositionally different. Further, the sub-layers can be permeable or impermeable. Of course, the sub-layers can be woven or non-woven.

In some examples, the layer 18 is permeable. That is, the layer 18 allows gas to pass therethrough. A woven, permeable layer 18 is preferred when forming is required.

In other examples, the layer 18 is impermeable. Impermeable layers can be utilized to contain air in cooperation with seat ventilation systems. Such impermeable layers are often bi-laminate (include 2 sub-layers) or tri-laminate (include 3 sub-layers). Of course, the sub-layers can be woven or non-woven.

In some examples where the layer 18 is impermeable, the layer 18 can include various, slits, holes and cut outs to provide for adequate out-flow of gas and venting of the mold 102. In other examples, air flow occurs at the edges of the layer 18. In addition, various venting features can be incorporated in the mold 102 such as edge venting and network venting (previously described) to further facilitate the outflow of gas and venting of the mold 102.

Both woven and non-woven layers are typically permeable. Films or thin solid sheets of material form layer or sub layer are impermeable. Examples of the layer 18 that are impermeable typically comprise a laminate include a plurality of layer including a polymeric film layer. In some examples, the polymeric film layer is sandwiched between two non-woven layers. The non-woven layer against the mold surface can be used to transfer gasses to a vent while the non-woven on the foam core side will enhance bonding of the layer 18 to the foam core 12.

When impermeable, the layer 18 which can also be a film or multiple films serving different purposes. One purpose could be to adhere the layer 18 well to the foam core 12 while allowing the layer 18 to slide silently over a seat frame. When the layer 18 includes a film (and is thus impermeable) and does not include woven or non-woven sub layers venting becomes necessary to transfer gasses to vent(s). If there is no network vent the layer 18 will seal off against the inner surface 104 of the mold 102 when the foam core 12 presses against the mold 102 to stop gas transfer/venting.

In various examples, the weight per area of the layer 18 is from about 100 to about 800, from about 140 to about 650, or from about 140 to about 450, g/m² (gsm). The layer 18 can have various stiffnesses and is typically somewhat stiff as is illustrated in FIG. 10. In various non-limiting examples, all values and ranges of values for the weight per unit area of the layer 18 including and between those described above are hereby expressly contemplated for use herein.

A method of molding a composite article 10 including the foam core 12 and the layer 18 with the assembly 100 is also disclosed herein. The assembly 100 and the composite article 10 are just as described above.

The method includes the steps of: providing the mold 102 (just as described above); providing the one or more sealing elements 112 (just as described above); engaging each of the one or more sealing elements 112 with each of the one or more retaining elements 118 to retain the sealing element in the mold in a vented position; inserting the layer 18 into the mold 102; injecting the polyurethane system into the mold 102; and reacting the polyurethane system to form the foam core 12, wherein the exothermic reaction and expansion of the components of the polyurethane system in the mold cavity 106 pushes the layer 18 into the one or more sealing elements 112 to move the one or more sealing elements 112 from the vented position to the closed position such that the head 114 of the sealing element 112 hermetically seals the gas discharge port 108 to prevent further venting and form the composite article 10.

In some examples, the method includes the step of disengaging the first and second parts and moving the first and second parts 120, 122 into the open position to expose the inner surface 104 of the mold 102. Once open, the layer 18 (and any additional layers) is inserted into the mold 102. The venting system of the subject disclosure enables venting through the entire extent of the layer 18. Advantageously, many examples of the subject composite article 10 include a layer 18 which extends to within about 10, 9, 8, 7, 6, 5, 4, 3, 2, mm of the parting line 124 across all or a portion of a perimeter of the composite article 10.

Further, the one or more sealing elements 112 and the gas discharge ports 108 enable the venting system to of this disclosure to fully vent the mold without any additional edge venting and/or network venting. In such examples, the parting line 124 can be moved away from the layer 18 and lower on the inner surface 104 of a sidewall 126 of the mold 102. This is a processing advantage because negative drafts in the lower portion of the mold cavity 106 can be eliminated. When a parting line 124 contains conventional vents (ribbons), these vents must be high to serve a venting roll. Moving the parting line 124 lower on the inner surface 104 of a sidewall of the mold 102 also moves the parting line 124 away from the edge of the layer 18. If the edge of the layer 18 gets caught in the parting line 124, flash or scrap results.

In various examples, a minimum distance between the edge of the layer 18 and the parting line 124 depend on the type of layer 18 (e.g. the type of cloth) and the dimensional quality of the layer 18 (coming out of forming, e.g. die cutting). Layers 18 having higher weight per unit area tend to be "stiffer" and more dimensionally consistent in both the formed and unformed states. Layers 18 such as woven or point bonded cloths tend to be more dimensionally consistent than layers 18 such as non-woven cloth but are at the same time poor at forming deeper draws (to handle contours on an outer surface of the composite article 10). Layers 18 such as cloths which are used with additional layers such as films laminated thereto (e.g. bi or tri laminates) are dimensionally consistent because the additional layer including film helps provide dimensional stability during the molding process. Notwithstanding the above, the layer 18 does not typically extend to the parting line 124 since dimensional variation may cause the layer 18 to extend into the parting line 124 and foul the molding process.

It should be appreciated that the composite article 10, and the dimensional integrity of the composite article 10, is critical for fit and function in applications, such as automobile seats. As such, any trimming of the composite article 10 required at where the parting line 124 was during molding creates variation that has the potential to create significant quality problems with the composite article 10 or the product, e.g. seat, which the composite article 10 is included in. The venting system of the subject disclosure allows the elimination of parting line 124 venting, and thus quality issues associated with parting line 124 venting and the ribbon vents or grooves that are commonly used therewith.

Prior to the step of reacting the polyurethane system, the mold 102 can be closed, i.e., the first and second parts 120, 122 can be engaged. As a matter of course, the composite article 10 formed with the method herein is yielded and disclosed just as described above.

Figure 8A:
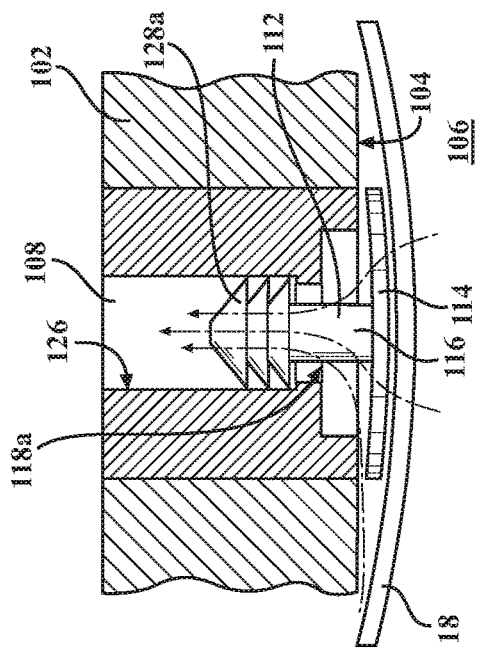
FIGS. 8A-8D are a series of schematic illustrations, which show enlarged, isolated cross-sectional views of the sealing element moveably engaged within the gas discharge port, with each of the illustrations describing various aspects of an example of the method disclosed herein.

FIGS. 8A-8D are a series of schematic illustrations which show enlarged, isolated cross-sectional views of the sealing element 112 moveably engaged within the gas discharge port 108, with each of the illustrations describing various aspects of an example of the method disclosed herein. In FIG. 8A, the sealing element 112 is moveably engaged within the gas discharge port 108 in the mold 102 in vented position. More specifically, the retainer 128a (Christmas tree) is engaged with the shelf 118a (retaining element 118), and the head 114 is disengaged from the passageway opening 110 of the gas discharge port 108. The bowed shape of the head 114 prevents the head 114 from prematurely sealing/engaging the passageway opening 110 of the gas discharge port 108.

Figure 8B:
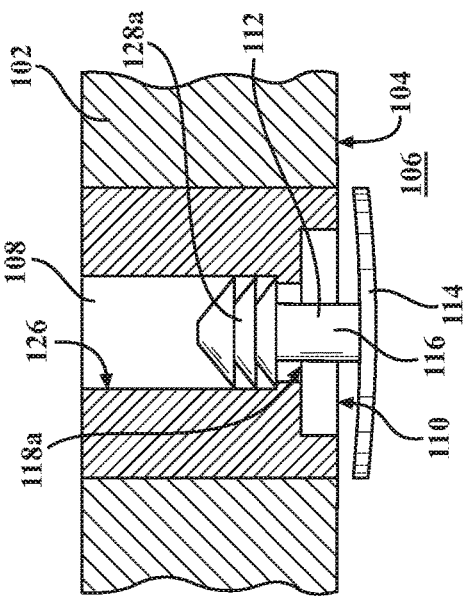
Figure 8C:
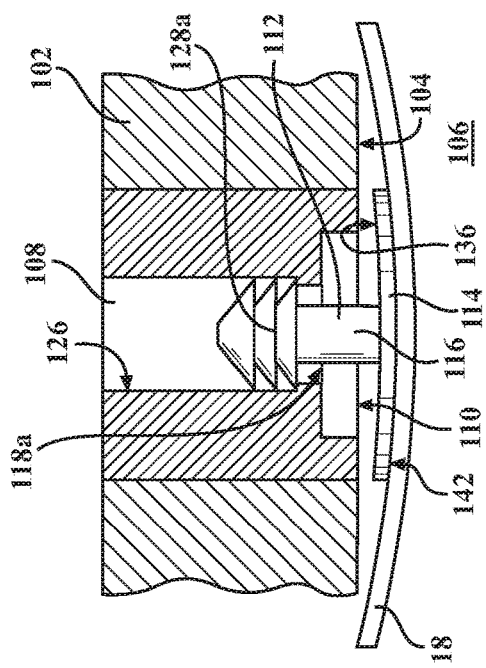
Figure 8D:
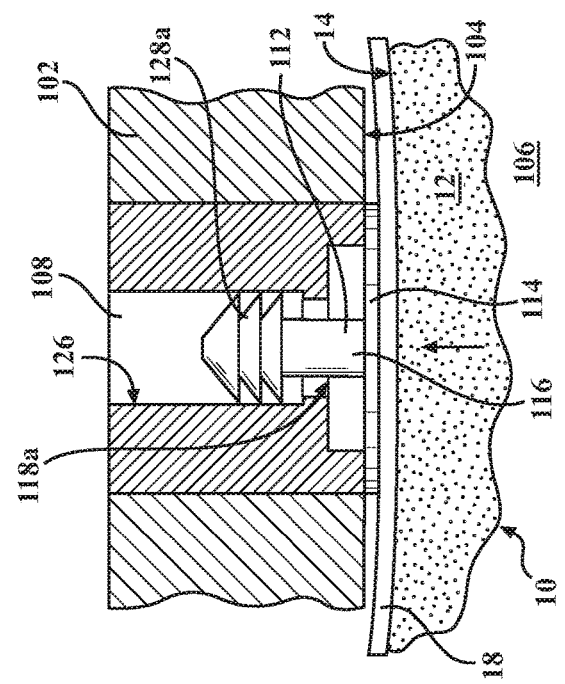
Figure 9A:
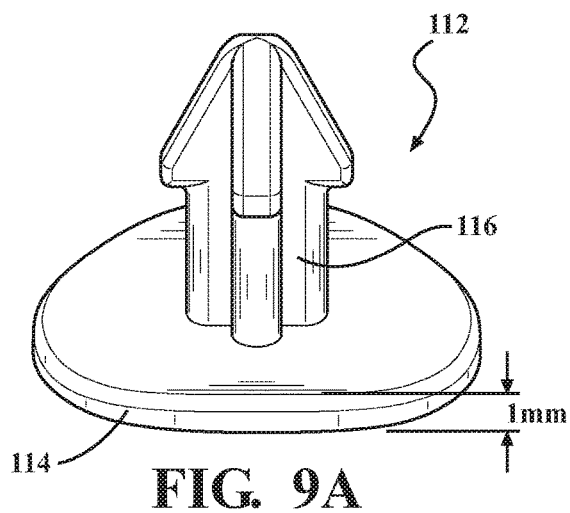
FIG. 9A is an enlarged perspective view of a sealing element having a 1 mm thick head.
Figure 9B:
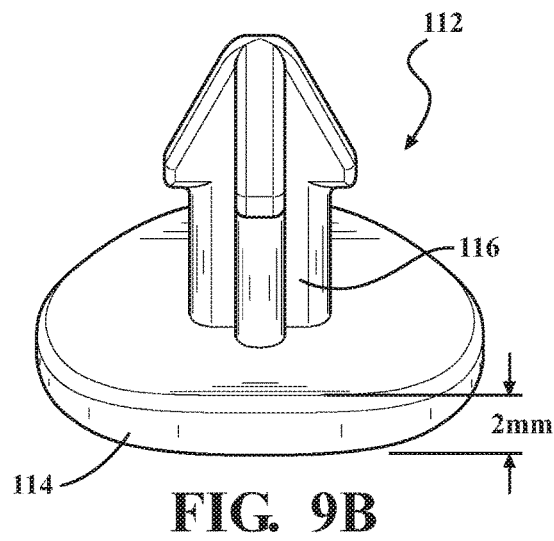
FIG. 9B is an enlarged perspective view of a sealing element having a 2 mm thick head.
Figure 9C:
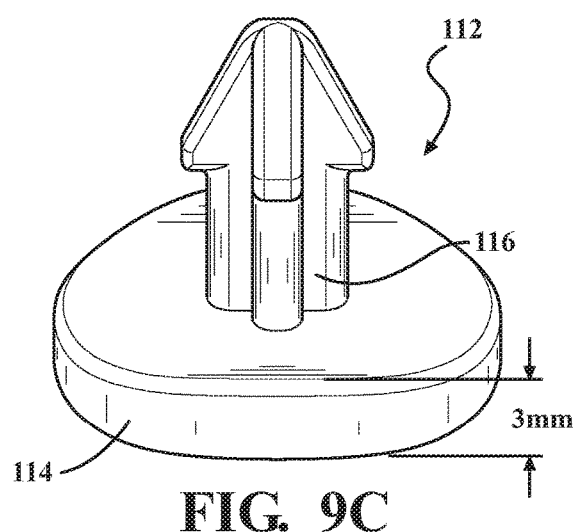
FIG. 9C is an enlarged perspective view of a sealing element having a 3 mm thick head.
Figure 9D:
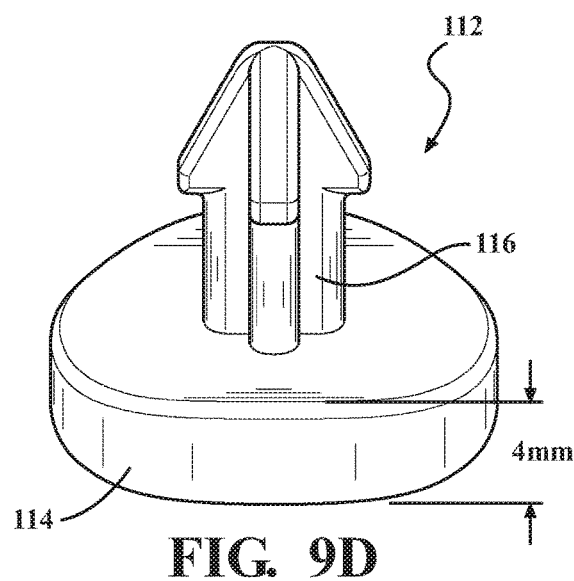
FIG. 9D is an enlarged perspective view of a sealing element having a 4 mm thick head.

In FIG. 8A, the sealing element 112 is hanging down via the force of gravity with the bottom conical skirt of the Christmas tree retainer 128a resting on the shelf 118a in the gas discharge port 108. FIG. 8B shows the flow of gas through the gas discharge port 108 with dashed lines when the sealing element 112 is in the vented position. FIG. 8C illustrates the sealing element 112 in the closed position. That is, FIG. 8C illustrates post reaction/expansion of the foam core 12 with the layer 18 thereon pushing the head 114 of the sealing element 112, the stem 116, and the Christmas tree retainer 128a upward such that the head 114 of the sealing element 112 is in the closed position and hermetically seals the passageway opening 110 and closes the gas discharge port 108 to prevent the flow of gas through the gas discharge port 108. In FIG. 8C, the passageway opening 110 is notched (or recessed) into the inner surface 104 of the mold 102. As such, the entry to the gas discharge port 108 is recessed into the inner surface 104 of the mold 102 such that the head 114 of the sealing element 112 sits into the notch/recess and prevents imperfections in the surface of the composite article 10, i.e., avoids the creation of a sunken spot in the layer 18 of the composite article 10. In FIG. 8D, the composite article 10 has been removed from the mold 102, and the sealing element 112 is in the vented position, with the mold 102 ready for use.

Many of the method steps described herein are included in U.S. Pat. No. 7,481,637, the contents of which are incorporated by reference herein.

It is to be understood that the appended claims are not limited to express any particular compounds, compositions, or methods described in the detailed description, which may vary between particular examples, which fall within the scope of the appended claims. With respect to any Markush groups relied upon herein for describing particular elements or aspects of various examples, it is to be appreciated that different, special, and/or unexpected results may be obtained from each member of the respective Markush group independent from all other Markush members. Each member of a Markush group may be relied upon individually and or in combination and provides adequate support for specific examples within the scope of the appended claims.

It is also to be understood that any ranges and subranges relied upon in describing various examples of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various examples of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific examples within the scope of the appended claims. In addition, with respect to the language, which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific examples within the scope of the appended claims. Finally, an individual number within a disclosed range may be relied upon and provides adequate support for specific examples within the scope of the appended claims. For example, a range "of from 1 to 9" includes various individual integers, such as 3, as well as individual numbers including a decimal point (or fraction), such as 4.1, which may be relied upon and provide adequate support for specific examples within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. An assembly for molding a composite article comprising a foam core and a layer thereon, said assembly comprising:
   a mold having an inner surface and at least partially defining a cavity, said mold including one or more gas discharge ports, each of said one or more gas discharge ports having a passageway opening in fluid communication with said cavity of said mold, and said mold having one or more retaining elements;
   one or more sealing elements moveably engaged with said mold, each of said one or more sealing elements corresponding with each of said one or more gas discharge ports, each of said one or more sealing elements comprises a head and a retainer with said retainer and is shaped to engage each of said one or more retaining elements on said mold in a vented position;
   a polyurethane system for forming said foam core; and
   said layer inserted in said cavity of said mold;
   wherein expansion of said polyurethane system with said layer thereon in said mold pushes each of said one or more sealing elements from said vented position to a closed position wherein said retainer disengages from said retaining element and said head of said sealing element hermetically seals said passageway opening and closes said gas discharge port during formation of said composite article, and
   wherein each of said one or more gas discharge ports are defined by a sidewall in said mold and said retaining element projects into said gas discharge port with said retainer engaging said retaining element within said gas discharge port when in said vented position.

2. The assembly as set forth in claim 1, wherein each of said one or more sealing elements further include a stem extending between said head and said retainer, wherein said stem is slideably engaged in said gas discharge port.

3. The assembly as set forth in claim 2, wherein said stem is shaped to have a smaller diameter at a proximal end adjacent said head and said retainer has a larger diameter at a distal end.

4. The assembly as set forth in claim 1, wherein an outer surface of said head includes a hook fastener configured to releasably connect with said layer.

5. The assembly as set forth in claim 1, wherein said sealing element is held in position via gravity in the vented position.

6. The assembly as set forth in claim 1, wherein said sealing element is held in position via a biasing element in the vented position.

7. The assembly as set forth in claim 1, wherein said sealing element has a weight of greater than about 1 g.

8. The assembly as set forth in claim 1, wherein said head has a thickness of greater than 0.25 mm.

9. The assembly as set forth in claim 1, wherein said sealing element is of unitary construction and formed via injection molding.

10. The assembly as set forth in claim 9, wherein said sealing element comprises silicone.

11. The assembly as set forth in claim 1, wherein said mold comprises a first part and a second part shaped to engage one another and form said cavity in a closed position.

12. The assembly as set forth in claim 11, wherein said mold including said one or more gas discharge ports forms said cavity and is and free of parting line vents.

13. The assembly as set forth in claim 1 further comprising a notch recessed in a sidewall of said mold and in fluid communication with said passageway opening of said gas discharge ports.

14. The assembly as set forth in claim 1, wherein said gas discharge port is formed with a threaded insert in a sidewall of said mold.

15. A method of molding a composite article comprising a foam core and a layer thereon with an assembly including a mold having one or more gas discharge ports and one or more sealing elements corresponding to the one or more gas discharge ports, said method comprising the steps of:
- providing the mold having an inner surface and at least partially defining a cavity, the mold including the one or more gas discharge ports and one or more retaining elements;
- providing the one or more sealing elements, each of the one or more sealing elements comprising a head and a retainer;
- engaging the retainer of each of the one or more sealing elements with each of the one or more retaining elements to retain the sealing element in the mold in a vented position;
- inserting the layer into the mold;
- injecting a polyurethane system into the mold; and
- reacting the polyurethane system to form the foam core, wherein an exothermic reaction and expansion of the polyurethane system in the cavity pushes the layer into the one or more sealing elements to move the one or more sealing elements from a vented position to a closed position such that the retainer disengages from the retaining element and such that the head of the sealing element hermetically seals the discharge port to prevent further venting and form the composite article; and
- wherein each of the one or more gas discharge ports are defined by a sidewall in the mold and the retaining element projects into the gas discharge port with the retainer engaging the retaining element within the gas discharge port when in the vented position.

16. The method set forth in claim 15, wherein the mold comprises a first part and a second part releasingly engageable between an open position and a closed position, and said method further comprises the step of disengaging the first and second parts and opening the mold.

17. The method set forth in claim 15 further comprising the step of closing the mold and engaging the first and second parts with the sealing element being in the vented position prior to injection of the polyurethane system.

18. A composite article formed with the method set forth in claim 15, wherein the layer extends to within 5 mm of the parting line.

* * * * *